United States Patent [19]

Thomas

[11] Patent Number: 4,471,873
[45] Date of Patent: Sep. 18, 1984

[54] DISTRESS FLAG KIT FOR MOTORISTS

[75] Inventor: Cole G. Thomas, Randolph, N.J.

[73] Assignee: Thomas-Pond Enterprises, Inc., Morristown, N.J.

[21] Appl. No.: 467,460

[22] Filed: Feb. 17, 1983

[51] Int. Cl.³ ...................... B65D 85/20; G09F 21/04
[52] U.S. Cl. ..................................... 206/573; 40/591; 40/597; 116/28 R; 116/42; 116/173; 206/225; 206/575; 248/206.2; 248/206.3; 248/514
[58] Field of Search ................. 40/591, 592, 593, 597, 40/603, 604, 617, 905; 116/42, 28 R, 173; 206/38, 225, 226, 232, 573, 575; 248/511, 514, 515, 517, 518, 528, 534, 536, 540, 541, 284, 206 R, 75; 281/30; 401/52

[56] References Cited

U.S. PATENT DOCUMENTS

| | | | |
|---|---|---|---|
| 83,700 | 11/1868 | Durand | 206/573 |
| 642,829 | 2/1900 | Wetsue | 401/52 |
| 914,777 | 3/1909 | Aarons | 40/597 |
| 2,167,579 | 7/1939 | Gardella | 248/534 |
| 2,171,875 | 9/1939 | Holden | 248/75 |
| 2,915,944 | 12/1959 | Butts | 248/480 |
| 3,081,054 | 3/1963 | Westervelt | 116/28 R |
| 3,148,856 | 9/1964 | Orlando | 116/173 |
| 3,273,118 | 9/1966 | Hendershot | 116/173 |
| 3,840,113 | 10/1974 | Bartleson | 206/575 |
| 4,375,134 | 3/1983 | Sheetz | 116/173 |

FOREIGN PATENT DOCUMENTS

| | | | |
|---|---|---|---|
| 498098 | 5/1930 | Fed. Rep. of Germany | 401/52 |
| 92332 | 6/1958 | Norway | 248/537 |

Primary Examiner—George E. Lowrance
Assistant Examiner—Jimmy G. Foster
Attorney, Agent, or Firm—Martha G. Pugh

[57] ABSTRACT

A kit for motorists in distress comprises a container which includes one or more furled distress signal flags, a flag staff, including one or more suction cups, journalled on a terminal portion of the staff, and rotatable from an inwardly-directed storage position to an outwardly-directed position for attachment to an external vehicle surface. An instruction sheet is enclosed to show how the flags are assembled; and an identification tag and writing instrument are enclosed for attachment to the flag in use. Each of the distress flags bears a different insignia, indicating that the car is disabled or out-of-gas, or that medical assistance is needed.

7 Claims, 12 Drawing Figures

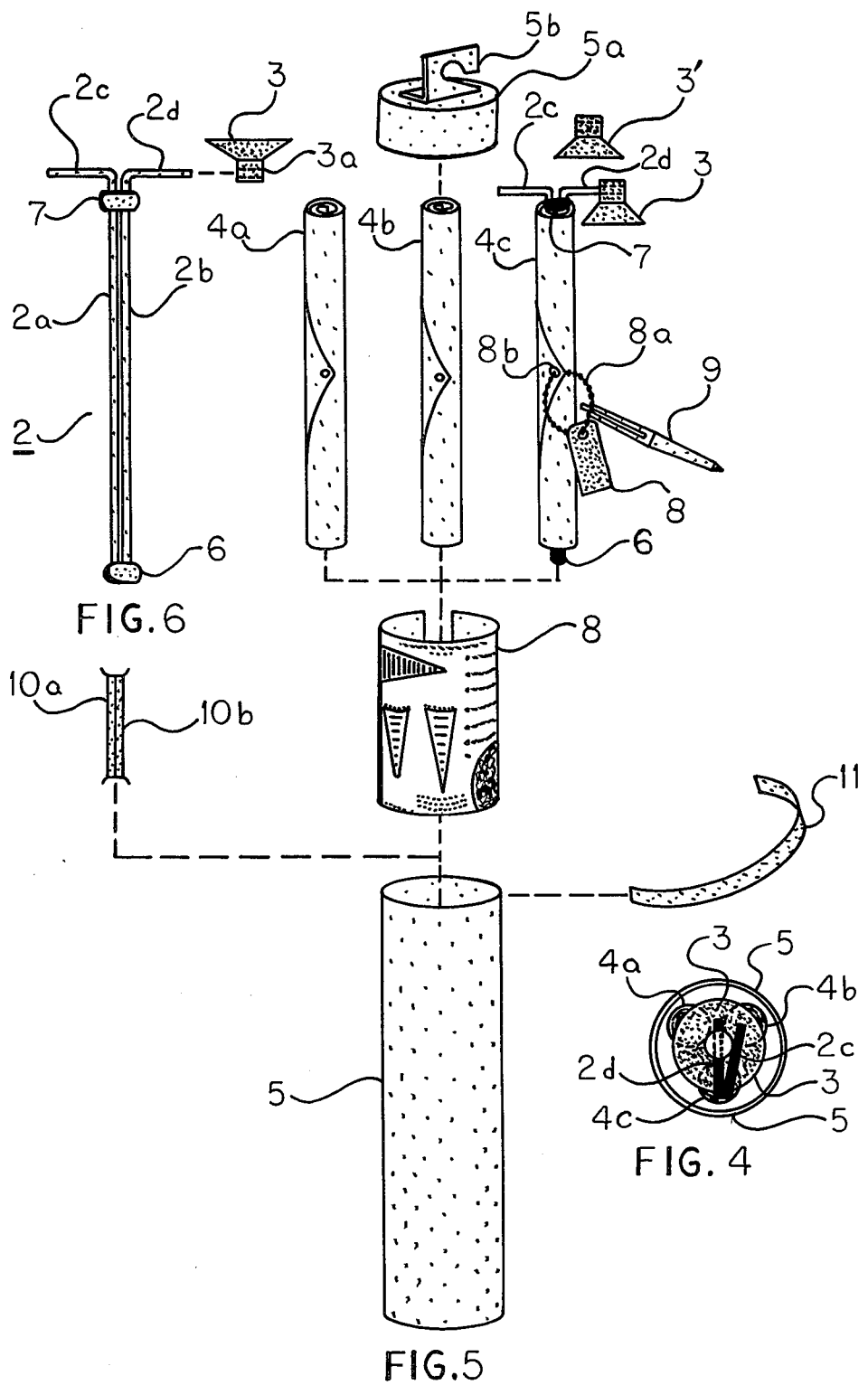

DISTRESS FLAG KIT FOR MOTORISTS

BACKGROUND OF THE INVENTION

This relates to a distress signal system for motorists, and more particularly, to a kit including distress signal flags to be carried or installed in vehicles, for use when the occasion demands.

On our busy system of super highways, it often happens that motorists having car trouble or a medical emergency, are faced with the problem of apprising passing motorists, or the police, of their predicament, or of identifying their vehicle if it is necessary to leave the vehicle and go for help. Many cars are equipped with flashing signal lights; but these require a drain on the battery, which may eventually run out of power. Further, the flashiing lights do not indicate the nature of the emergency. Many motorists may attempt to fly a make-shift distress flag; but a problem arises in securely attaching such a flag to an external surface of the vehicle in a manner whereby it will not blow away. Further, such a make-shift device does not apprise the passerby of the nature of the emergency.

It is therefore the principal object of this invention to provide an improved distress signal system for motorists, one which is designed to apprise the passersby of the nature of the emergency and which can be securely and readily installed on an external surface of the vehicle, such as a windshield or window in a position to be readily viewed by passing motorists or the police.

These and other objects are realized in the distress flag kit of the present invention which comprises a storage container including a set of instructions, and one or more furled distress flags, together with a flag staff. The latter may comprise one or more metal rods having bent terminals on which are journalled one or more suction cups. The resilient suction cups may be rotated inwardly for storage in the container, and outwardly for use, so that one end of the flag staff can be readily secured to an external vehicle surface. In a preferred embodiment, the flag staff comprises a pair of parallel rods, which are removably seated together at their outer ends in a small resilient plastic cap. At least one of the inner bent ends is constructed to fit slidably into a bore in the solid cylindrical shank or base of a frusto-conical plastic suction cup, which is disposed to rotate about the flag staff terminal as an axis. When the appropriate flag is selected for display, the resilient cap is removed from the outer ends of the flag staff rods, and one of the rods is threaded through a sleeve along the upper end of the selected flag. The cap is then again seated on the ends of the flag staff rods, holdiing them together so that the upper edge of the flag is secured between them. The suction cup is then threaded onto one of the bent terminals at the inner end of the flag staff, and rotated through 180 degrees to operated position. If desired, a second suction cup may be applied to the other bent terminal, and rotated outwardly for use position. The suction cups are then pressed firmly against an external car surface, such as a window, supporting the flag staff in cantilever position, so that the distress flag projects out in a direction normal to or transverse to the car window surface so that it is readilys seen by passerby.

In a preferred kit, three flags may be included, one of which bears the legend "DISABLED", another, a picture of a dripping gas tank indicating "out-of-gas", and a third, a red cross, indicating a medical emergency.

If it is necessary to leave the car and go for help, a tag from the kit may be filled out and attached to the selected flag indicating the name and address of the owner of the car.

These and other objects, features and advantages of the invention may be realized by a study of the detailed specification hereinafter with reference to the attached drawings.

SHORT DESCRIPTION OF THE DRAWINGS

FIG. 4 is a view looking down into the kit with the top removed.

FIG. 5 is an exploded view of the kit of the present invention with the lid opened, and its contents in the process of removal, including an instruction sheet, a plurality of furled distress flags, one of which is wrapped around a flag staff which includes a suction cup attached to one terminal, and an attached identification tag and writing instrument.

FIG. 6 is a side elevation of the flag staff and suction cup, removed from the kit.

DETAILED DESCRIPTION OF THE INVENTION

Figure 1:
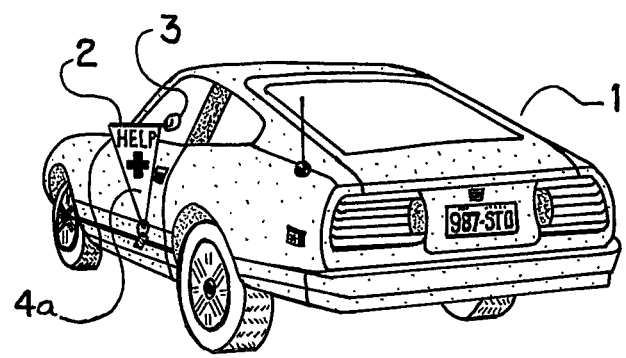
FIG. 1 shows a distress flag in accordance with the present invention in use on a vehicle.

Referring now to the drawings, there is shown a conventional motor vehicle 1, presumably packed on the highway, to which a distress flag, in accordance with the present invention, has been attached to indicate to passersby that there is an emergency. The flag 4a is supported by a staff 2 terminating in a suction cup 3 which has been secured to a vehicle window or other flat surface, so that the flag 4a is supported out from the surface and hangs in a plane transverse to the plane of the supporting surface, so that it can be readily seen by passing motorists or the police.

Figure 2:
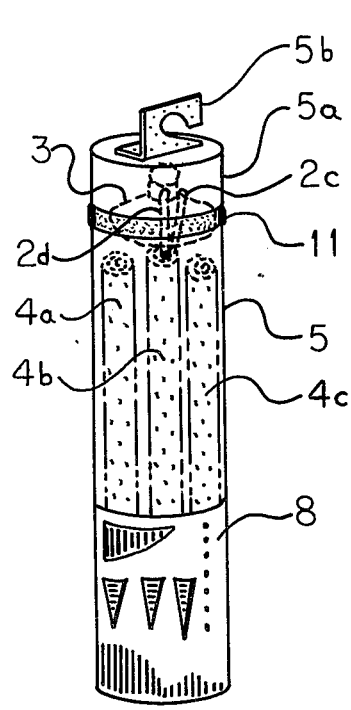
FIG. 2 shows the distress flag kit of the present invention completely assembled.
Figure 3:
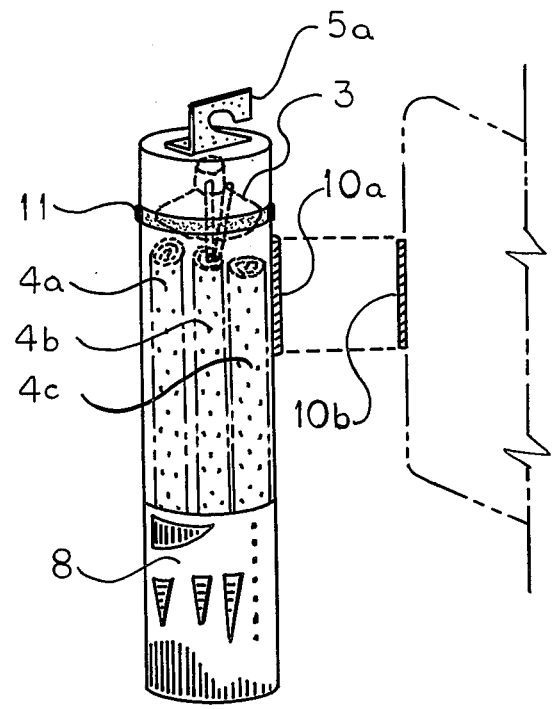
FIG. 3 shows the assembled kit of the present invention in the process of attachment to an interior surface, such as a dashboard of a vehicle, for the purpose of storage.

In accordance with the present invention, as shown in FIGS. 2 and 3, the kit of the present invention, comprises a cylindrical container, which, for convenience, may be, say 12½ inches long and 2 inches in inner diameter, preferably formed from a tube 5 of clear plastic, semi-resilient material, such as, for example, extruded polypropinate, which, in the present embodiment has a wall thickness of, say 1/64th inch. This is closed at one end, and open at the other end. The open end is constructed to be closed by a shallow cylindrical vacuum-formed plastic cap or top 5a, which fits over in flush relation to the top edge of tube 5, having a lateral flange which extends about ⅛ inch below the top edge. This may be equipped with a plastic hanger 5b which is constructed to lie flat when the kit is stored, but a portion of which may be bent upward if it is desired to hang the container from a hook or other support. The cap 5a may be sealed in place on the tube 5 by an adhesive strip 11 wrapped around its lower edge.

The container 5 may be fastened to the dashboard, or other interior surface of the vehicle, by a pair of strips 10a, 10b or fastening material known by the trademarks "VELCRO" or "SABER GRIP". The outside faces of strips 10a, 10b each include a layer of pressure-sensitive adhesive which can be respectively fixed to the external surface of tube 5, and to an internal surface of the vehicle, such as the dashboard. Thus, the internal surfaces of the "VELCRO" or "SABER GRIP" strips can then be fastened together to secure the kit in a convenient storage position inside of the vehicle.

FIGS. 2 and 3 show, in phantom, the elements of the combination in storage inside of the container tube 5. These include a plurality of furled distress flags 4a, 4b and 4c, which will be described in detail hereinafter. For storage, one of these flags may be wrapped about a flag staff 2 comprising a pair of rods having a pair of bent terminals 2c, 2d, at least one of which is journalled in the solid base portion of a suction cup 3, all of which elements are to be described in detail hereinafter.

FIG. 4 shows the assembled elements looking down into the kit, with the lid removed, the suction cup 3 disposed in storage position above the ends of flags 4a, 4b and 4c, just inside the cap of tube 5.

FIG. 5 is an exploded view with the elements in the process of being removed from the tubular container 5. These include a direction sheet 8, three distress signal flags 4a, 4b and 4c, the latter being conveniently wrapped about the staff 2 so that its bent terminals 2c, 2d protrude from the top of the roll. The suction cup 3, for convenience, may be attached to one of the bent terminals, 2d. For added convenience, the kit preferably includes a second suction cup 3' for attachment to the opposite bent terminal 2c.

For further assistance to the motorist in distress, a conventional tag 8, which may be paper in a plastic envelope, is attached by a chain 8a connected through a small hole 8b at the apex end of flag 4c, together with a conventional writing implement 9. The chain 8a may be disconnected and removed from flag 4c and installed instead in a similar hole in either of flags 4a or 4b.

The flag staff 2 is shown in detail in FIG. 6. This comprises a pair of parallel rods 2a, 2b, each about 11½ inches long, and each terminating at one of its ends in a terminal portion bent through approximately a right angle, which terminals 2c, 2d extend out about 1 inch from the ends of the rods. The rods 2a, 2b may be of steel, preferably about ⅜ inch in diameter. One pair of the ends of the rods 2a, 2b is seated in a resilient cup 7, of, for example, polyvinylchloride, which holds them in parallel relation. The other ends of rods 2a, 2b are held in parallel relation by a band 8 about ⅜ inch wide, of a similar resilient material, placed adjacent the bent terminals 2c, 2d.

The combination may include one or more suction cups 3, 3' each of which is in the form of a frustum of a right-angle cone, about 2 inches in maximum diameter and about ¾ inch deep along the axis, not including a solid cylindrical base member 3a. The latter is about ⅜ inch in diameter, centered on the axis of the cone, and extends about ¼ inch beyond the end, in the direction of the projected apex of the cone. The base member 3a has a bore about 1/16–3/32 inch in diameter, parallel to and about ⅛ inch in from its endface, which bore is constructed to accommodate rotatably in interference fit, one of the terminals 2c, 2d. Thus, the suction cup 3 is mounted for rotation through 180 degrees from a first inner position for storage, in which it just fits inside of tube 5 above the ends of the furled flags 4a, 4b and 4c, to a second, outer, use position, in which it serves to support the rods 2a, 2b in transverse relation to a flat surface, such as a vehicle window. Preferably a second suction cup 3', substantially identical suction cup 3, is connected to the other terminal 2c, disposed at 180 degrees to terminal 2d, so that the flag staff comprising the parallel rods 2a, 2b is supported with added stability.

The instruction sheet 8 bears a description of the elements of the kit, and describes how the selected distress flag is assembled and attached to the vehicle.

Figure 8:
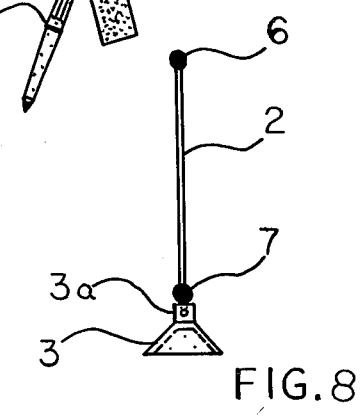
FIG. 8 is a plan view of the flag staff with a suction cup in operated position.
Figure 7:
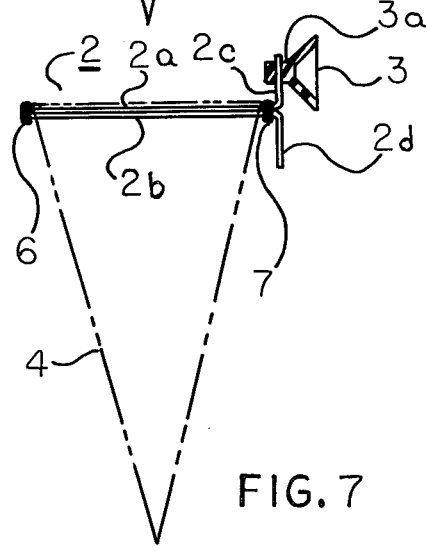
FIG. 7 shows the manner of attachment of a distress flag staff with a suction cup in operated position for connection to an external vehicle surface.
Figure 9:
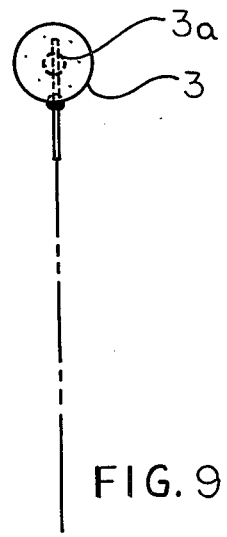
FIG. 9 is a view looking down on the suction cup rotated into storage position.

FIGS. 7, 8 and 9 show how the flag staff is threaded through a sleeve at one end of the selected triangular distress flag 4a, 4b or 4c, and how the suction cups 3, 3' are rotated to operating position for installation on the vehicle window, or other external surface.

Figure 11:
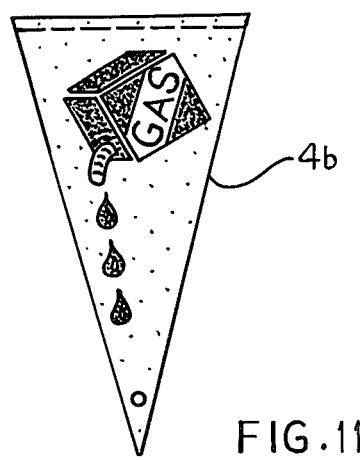
FIGS. 10, 11 and 12 show possible designs of individual distress flags included in the kit, the flag of FIG. 10 having attached thereto a writing instrument and identification tag.
Figure 10:
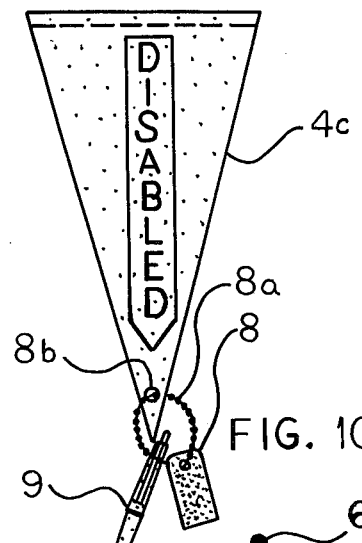
Figure 12:
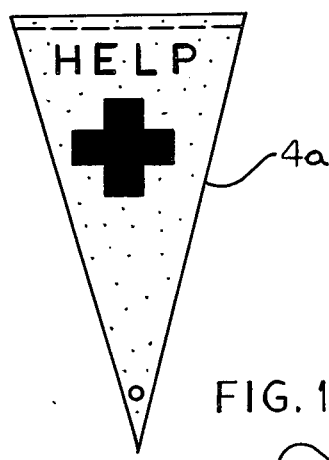

In preferred form, the kit may include three distress flags shown in FIGS. 10, 11 and 12. Each of these may take the form of a triangle, say 22 inches along its principal axis and about 10 inches across the base, and having a sleeve across the upper end formed by folding back about ½ inch of material and sealing it across the outer flag surface. This forms an opening about ¼ inch in cross-section which accommodates one of the rods 2a, 2b so that the flag is secured between them when the cup 6 and band 7 are in place.

The flags are preferably formed of a flexible material, such as, for example, a loosely woven web of polyester material laminated with a plastic, such as polyvinylchloride. This provides a flexible sheet having sufficient weight (just under an ounce) and body to keep it from being excessively beaten about the the wind.

The chain 8a is threaded through the small hole 8b about ¼ inch in diameter near the apex of a selected one of the triangular flags 4a, 4b and 4c. This suppots the tag 8 and the writing implement 9, which serve the dual purpose of permitting the owner to indicate his name and address, if the car is left, and of providing a weight which prevents the flag from whipping about in the wind.

Each of the three flags 4a, 4b, 4c has a different indicia, the one appropriate to the circumstances being selected for use. For example, flag 4a, as indicated in FIG. 10, bears the notation "DIABLED" in block letters. A second flag, 4b shown in FIG. 11, may indicate an empty gas tank. A third flag 4c, shown in FIG. 12 shows a red cross, and is marked "HELP" to indicate a medical emergency.

The color and surface characteristics of each of the flags are chosen for maximum visibility, day or night. For example, the distress flag may be a bright orange with black block letters on a white background. The out-of-gas flag may be orange on a white background. The medical emergency flag may be the usual red cross on a white background, with "HELP" printed thereon in black, block letters.

Although the invention has been described by way of illustration with reference to specific embodiments, it will be understood that the invention is not limited to the specific structures shown and described, but only by the scope of the appended claims. For example, the kit may enclose only a single distress flag or any number of distress flags desired.

What I claim is:

1. An accessory kit for vehicle use by motorists in distress comprising in combination:

an elongated container having a closure constructed to be readily opened;

at least one distress signal flag constructed for storage in said container when furled up helically about a longitudinal axis, said flag bearing indicia indicating distress;

a flag staff comprising one or more rods constructed to be secured along an edge of said at least one distress signal flag, said one or more rods each having a terminal which is bent through an angle transverse to the principal axis of said one or more rods;

at last one suction cup having a solid base member having a bore transverse to the longitudinal axis of said base member, said bore being journalled for rotation of said cup about said bent terminal portion as an axis, said rod, including said cup jouranlled on said terminal portion, disposed for rotation about the principal axis of said rod from a first inwardly-directed position with said bent terminal portion and said cup directed to the interior of said container for storage, to a second outwardly-directed position wherein said cup is rotated outwardly about said terminal portion for use, said suction cup, being constructed and arranged in said outwardly-directed position for attachment to an external surface of said vehicle in supporting relation to one end of said flag staff, supporting an edge of said distress signal flag suspended in a plane transverse to the principal plane of the supporting surface of said vehicle.

2. The combination in accordance with claim 1 wherein said flag is formed with a sleeve along one edge; and wherein said flag staff comprises a pair of rods disposed in parallel relation, each having a terminal portion bent through approximately a right angle, at least one of said rods threaded through said sleeve;

said rods being fastened together in substantially parallel relation by a tight-fitting cap of elastic material disposed over said one pair of ends of said rods, and the other pair of ends of said rods being fastened together by a resilient band surrounding said rods adjacent the bent terminal portions; the ends of said rods being disposed in said cap and said band for rotation about their axes from said inwardly-directed position in which said terminal portions are directed in approximately the same direction for storage, to said outwardly-directed position in which said terminal portions are oppositely directed, and a suction cup having a solid base member having a bore transverse to the axis of said base member, journalled for rotation on the bent terminal portion of each said rod, said suction cups being constructed and arranged in said outwardly-directed position for attachment to an external surface of said vehicle in supporting relation to one end of each of said rods which are constructed to support between them at least one edge of said distress signal flag suspended in a plane transverse to the principal plane of the supporting surface of said vehicle.

3. The combination in accordance with claim 1 wherein a writing instrument and tag are connected to the lower end of said at least one distress flag.

4. The combination in accordance with claim 1 wherein said kit comprises three distress flags, each helically furled, about a longitudinal axis comprising one said flag staff for storage in said container.

5. The combination in accordance with claim 4 wherein one said distress flag bears indicia that said vehicle is disabled, another said distress flag bears indicia that said vehicle is out of gas, and another said distress flag bears indicia that medical assistance is needed.

6. The combination in accordance with claim 1 which includes an instruction sheet for mounting a flag staff and distress flag on said vehicle.

7. The combination in accordance with claim 1 wherein said container is cylindrical in form, having an axial length exceeding the length of said flag staff, and having an inner diameter just exceeding the maximum diameter of said suction cup.

* * * * *

UNITED STATES PATENT AND TRADEMARK OFFICE
CERTIFICATE OF CORRECTION

PATENT NO. : 4,471,873
DATED : September 18, 1984
INVENTOR(S) : COLE G. THOMAS

It is certified that error appears in the above-identified patent and that said Letters Patent are hereby corrected as shown below:

Col. 1, line 53, change "holdiing" to ---holding---.
Col. 2, line 46, change "packed" to ---parked---.
Col. 3, line 55, change "5/8" to ---1/8---.
Col. 4, line 42, change "suppots" to ---supports---.
Col. 4, line 51, change "DIABLED" to ---"DISABLED"---.

Signed and Sealed this

Nineteenth Day of February 1985

[SEAL]

Attest:

DONALD J. QUIGG

Attesting Officer   Acting Commissioner of Patents and Trademarks